(12) United States Patent
Andall (10) Patent No.: US 10,933,309 B2
(45) Date of Patent: Mar. 2, 2021

(54) SENSING APPARATUS AND METHOD (71) Applicant: Sony Interactive Entertainment Europe Limited, London (GB)

(72) Inventor: Hogarth Andall, London (GB)

(73) Assignee: Sony Interactive Entertainment Europe Limited

( * ) Notice: Subject to any disclaimer, the term of this patent is extended or adjusted under 35 U.S.C. 154(b) by 0 days.

(21) Appl. No.: 16/485,912

(22) PCT Filed: Feb. 8, 2018

(86) PCT No.: PCT/GB2018/050354
§ 371 (c)(1),
(2) Date: Aug. 14, 2019

(87) PCT Pub. No.: WO2018/150162
PCT Pub. Date: Aug. 23, 2018

(65) Prior Publication Data
US 2020/0054940 A1    Feb. 20, 2020

(30) Foreign Application Priority Data
Feb. 14, 2017 (GB) ..................................... 1702352

(51) Int. Cl.
 A63F 13/00     (2014.01)
 A63F 13/212    (2014.01)
 A63F 13/24     (2014.01)
 A63F 13/424    (2014.01)
 A63F 13/98     (2014.01)

(52) U.S. Cl.
 CPC ............ *A63F 13/212* (2014.09); *A63F 13/24* (2014.09); *A63F 13/424* (2014.09); *A63F 13/98* (2014.09)

(58) Field of Classification Search
None
See application file for complete search history.

(56) References Cited

U.S. PATENT DOCUMENTS

| 8,215,483 B2 * | 7/2012 | Wakitani .............. A63F 13/02 206/305 |
| 2004/0023719 A1 * | 2/2004 | Hussaini .............. A63F 13/24 463/37 |
| 2008/0220865 A1 | 9/2008 | Hsu |

(Continued)

FOREIGN PATENT DOCUMENTS

| CN | 203507497 U | 4/2014 |
| CN | 205627036 U | 10/2016 |
| EP | 2540221 A1 | 1/2013 |

OTHER PUBLICATIONS

Great Britain Examination Report for Application No. 1702352.4 dated Mar. 27, 2020, 3 pages.

(Continued)

*Primary Examiner* — Paul A D'Agostino
(74) *Attorney, Agent, or Firm* — Lerner, David, Littenberg, Krumholz & Mentlik, LLP (57) ABSTRACT

A biofeedback sensor attachment for a controller, the biofeedback sensor attachment comprising one or more sensors for obtaining biofeedback information arranged such that at least one sensor is in contact with a user's hand during normal use of the controller, and an output unit operable to output the biofeedback information about measurements made by the one or more sensors.

15 Claims, 4 Drawing Sheets

(56) References Cited

U.S. PATENT DOCUMENTS

| | | | |
|---|---|---|---|
| 2008/0227546 A1* | 9/2008 | Roberts | A63F 13/24 |
| | | | 463/38 |
| 2008/0318673 A1 | 12/2008 | Rofougaran et al. | |
| 2009/0098519 A1* | 4/2009 | Byerly | G09B 23/28 |
| | | | 434/247 |
| 2009/0233710 A1* | 9/2009 | Roberts | A63F 13/06 |
| | | | 463/30 |
| 2009/0270170 A1 | 10/2009 | Patton | |
| 2011/0009193 A1 | 1/2011 | Bond et al. | |
| 2011/0183757 A1 | 7/2011 | Furuta et al. | |
| 2012/0116176 A1* | 5/2012 | Moravec | A61B 5/486 |
| | | | 600/300 |
| 2012/0157263 A1* | 6/2012 | Sivak | G06F 3/011 |
| | | | 482/4 |
| 2012/0178529 A1* | 7/2012 | Collard | A63F 13/06 |
| | | | 463/31 |
| 2012/0229270 A1* | 9/2012 | Morley | A61B 5/02416 |
| | | | 340/539.12 |
| 2014/0022402 A1* | 1/2014 | Mishra | H04N 21/47214 |
| | | | 348/207.11 |
| 2014/0112556 A1 | 4/2014 | Kalinli-Akbacak | |
| 2014/0168100 A1* | 6/2014 | Argiro | A63F 13/98 |
| | | | 345/173 |
| 2014/0171201 A1 | 6/2014 | May et al. | |
| 2014/0256431 A1 | 9/2014 | Pope et al. | |
| 2016/0067136 A1* | 3/2016 | Raghavan | A61B 5/486 |
| | | | 601/40 |
| 2016/0132111 A1* | 5/2016 | Lowe | G01D 5/16 |
| | | | 345/156 |
| 2016/0246370 A1* | 8/2016 | Osman | G06T 19/006 |
| 2016/0259408 A1* | 9/2016 | Messingher | G06F 3/041 |

OTHER PUBLICATIONS

International Search Report and Written Opinion corresponding to PCT/GB2018/050354, dated Apr. 19, 2018, 16 pgs.

Mohammad Abu Raihan Miah et al.; "Low Cost Computer Based Heart Rate Monitoring System Using Fingertip and Microphone Port"; Informatics Electronics & Vision (ICIEV); 2013 International Conference on IEEE; May 17, 2013; pp. 1-4.

Combined Search and Examination Report, dated Jul. 12, 2017 in United Kingdom Application No. GB1702352.4.

* cited by examiner

SENSING APPARATUS AND METHOD

This disclosure relates to a sensing method and apparatus.

There is a desire in computer gaming to provide an immersive and highly interactive experience for players, so as to enhance the enjoyment of the player. This has become of particular interest with the increasing availability of head-mountable displays (HMDs), which are provided with the intention of fully immersing a player in the in-game environment.

In view of such a desire, it is advantageous to provide peripherals that allow a greater range of interaction with a computer game or other application. However if such peripherals are perceived as expensive, consumers are unlikely to purchase them. This problem is magnified by the tendency for limited content to be able to take advantage of the additional functionality of such peripherals when they first launch, and as such a user would anticipate limited usage of the peripheral and thus the incentive to purchase such a peripheral is reduced further. Consequently there is then little incentive for a content producer to provide such functionality in view of the limited number of users who would be able to experience it, as their resources would be better invested in other areas of the production of the content.

Therefore there is a problem that without a large consumer take-up of peripherals there is little content produced to take advantage of such peripherals, and as there is little content there is a reduced take-up of a peripheral. Therefore there is a need to provide a low-cost peripheral that is able to provide increased functionality for a range of different applications, so as to encourage a greater take-up and as a result encourage content providers to provide additional functionality in the content.

The present disclosure is defined by claims 1 and 10, with further features disclosed in the appended claims.

Embodiments of the disclosure will now be described with reference to the accompanying drawings, in which.

The present disclosure relates to sensor arrangements that add functionality to existing peripherals, rather than being provided separately as an entirely new peripheral. This may provide a cheaper alternative to purchasing specialised peripherals, and thus increases the chance that a user will purchase equipment to enable the additional functionality associated with the sensors.

An example of a sensor that provides a new input that could be utilised to tailor content for users is one that measures electrodermal activity (EDA). Such sensors are operable to measure electrical conductance or voltage between two points—in this case, between two areas of a user's skin. Active sensors apply a small current to the user's skin in order to detect the conductance, while passive sensors measure a voltage without applying a current by use of a voltage amplifier. Such sensors may measure Galvanic Skin Resistance (GSR) and/or Galvanic Skin Potential (GSP). These measurements may vary in dependence upon a number of factors, such as how active a wearer's sweat glands are.

Measurements such as GSR and GSP may be indicative of a user's emotions (or at least a level of emotional arousal), such that it is possible to determine when a user is experiencing emotional responses to their environment. This is because when experiencing any of a number of emotions, the sweat glands may be stimulated and thus a change in the EDA can be measured.

Figure 1A:
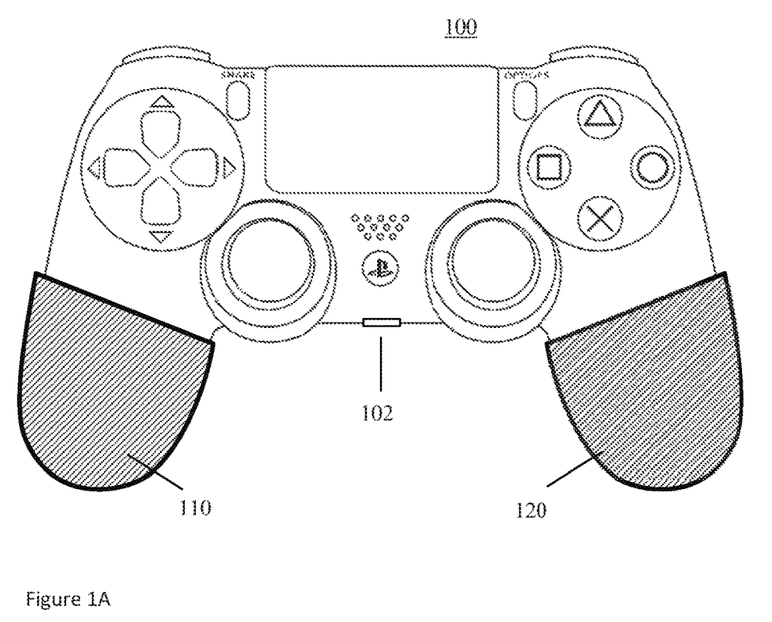
FIGS. 1A-1D schematically illustrate a peripheral with additional sensors.
Figure 1B:
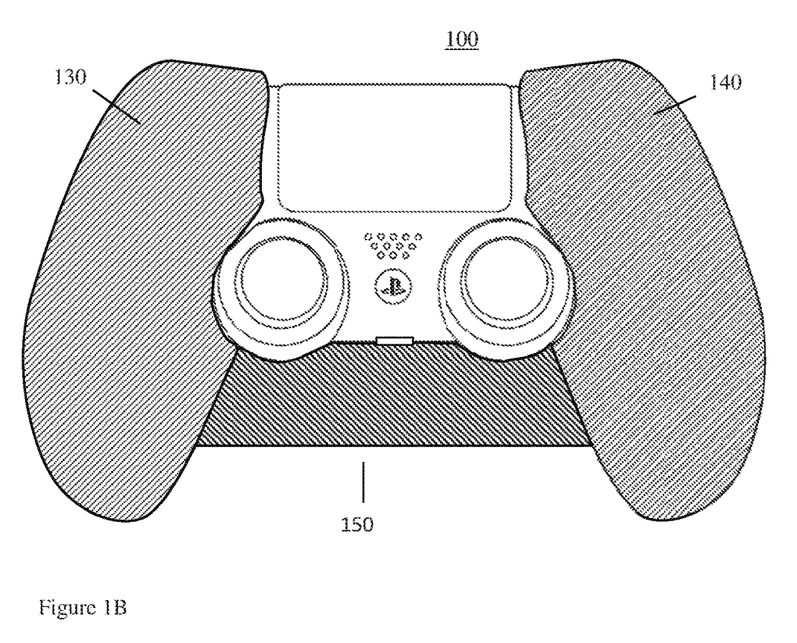

FIGS. 1A and 1B schematically illustrate a Sony® DualShock® 4 controller that has been equipped with supplementary sensors. The use of the sensors with this controller is exemplary only, of course, and it should be appreciated that any type of videogame controller may be suitable for use with additional sensors. Rather than being limited to those illustrated in FIGS. 1A and 1B, a particular biofeedback sensor attachment for a controller may be considered appropriate if it comprises one or more sensors arranged such that at least one sensor is in contact with a user's hand during conventional use of the controller. In embodiments, these sensors may be arranged on one or more sleeves that enclose at least a portion of the controller.

FIG. 1A shows an embodiment in which a controller 100 has been fitted with a pair of sleeves 110 and 120 that fit over the arms of the controller 100. The sleeves 110 and 120 comprise sensors that are suitable for measuring EDA via a user's hands. In normal use of the controller 100, the sleeves provide a suitably large contact area with the user's hands whilst not extensively modifying the shape of the controller 100. It is apparent that only one of these sleeves need be provided, as the EDA may be measurable from either hand independently; however, providing a second sensor may help improve the accuracy of measurements.

FIG. 1B illustrates an embodiment in which a more extensive sensing apparatus is provided. The sensing apparatus illustrated in FIG. 1B is provided in 3 parts, each of which may be provided individually or in conjunction with any of the others. The left- and right-hand portions 130 and 140 function similarly to the sleeves 110 and 120 of FIG. 1A, but provide a much greater coverage of the controller 100. The increased size of the portions 130 and 140 relative to the sleeves 110 and 120 may allow for the use of larger and/or a greater number of sensors. This may improve the accuracy of measurements, due to an increased contact area with the user's skin, or simply ensure that a measurement is always able to be made during use regardless of how the user holds the controller.

It will be appreciated that the arrangements seen in FIGS. 1A and 1B may be modular, so that sleeve 110, 120 forms a detachable first part of larger sleeve 130, 140. This provides flexibility in the trade-off between EDA measurement accuracy and encroachment on the existing controls of the device. The sleeves may attach via a Velcro® or other attachment method, or may be moulded with respect to the controller so that they fit adjacent to one another. Alternatively or on addition they may respectively attach via a mutual sensor control unit 150 (discussed later herein). The sensors of the modular sleeves may be electrically independent or electrically connect to each other either directly or via the sensor control unit to form a larger sensor system.

Sensors for measuring EDA generally comprise a pair of electrodes which, when in use, are in electrical contact via the user's body. In the present arrangement, each sleeve could comprise one or more electrodes; if each sleeve only comprises a single electrode, it may be necessary to provide more than one sleeve to be able to perform any detection, for example with one sleeve on each handle of a two handed-controller, and/or in a modular fashion as described above. If the electrodes are electrically isolated from one another, it may be possible to arrange a large number of electrodes on a device so as to ensure that a user makes contact with the electrodes no matter their hand size or grip style or the like.

Sensors could also be provided over commonly-used buttons, or buttons on which the user rests their fingers, rather than (or in addition to those) on the body of the controller. While this means that contact with the sensors may be intermittent, the contact may still be enough to enable measurements to be made. Placing sensors on the buttons may be advantageous in that the user's comfort when holding the controller may be impacted to a lesser degree—generally users are used to the feel of a controller in their hand and so even small changes may make the controller feel unwieldy or uncomfortable. It may therefore be advantageous to ensure that changes to the controller are reduced where possible.

In some embodiments, sensors may be provided that clip onto the controller (or are otherwise affixed) that may be affixed to a user's hands or fingers via a strap. These sensors may be instead of the sleeve-type arrangement described above, or in addition. While the provision of such sensors may be advantageous in that they provide a constant contact with the user's skin, the user may regard this as being more invasive than a sleeve-type arrangement as discussed above in which no additional components have to be worn by a user.

Figure 2:
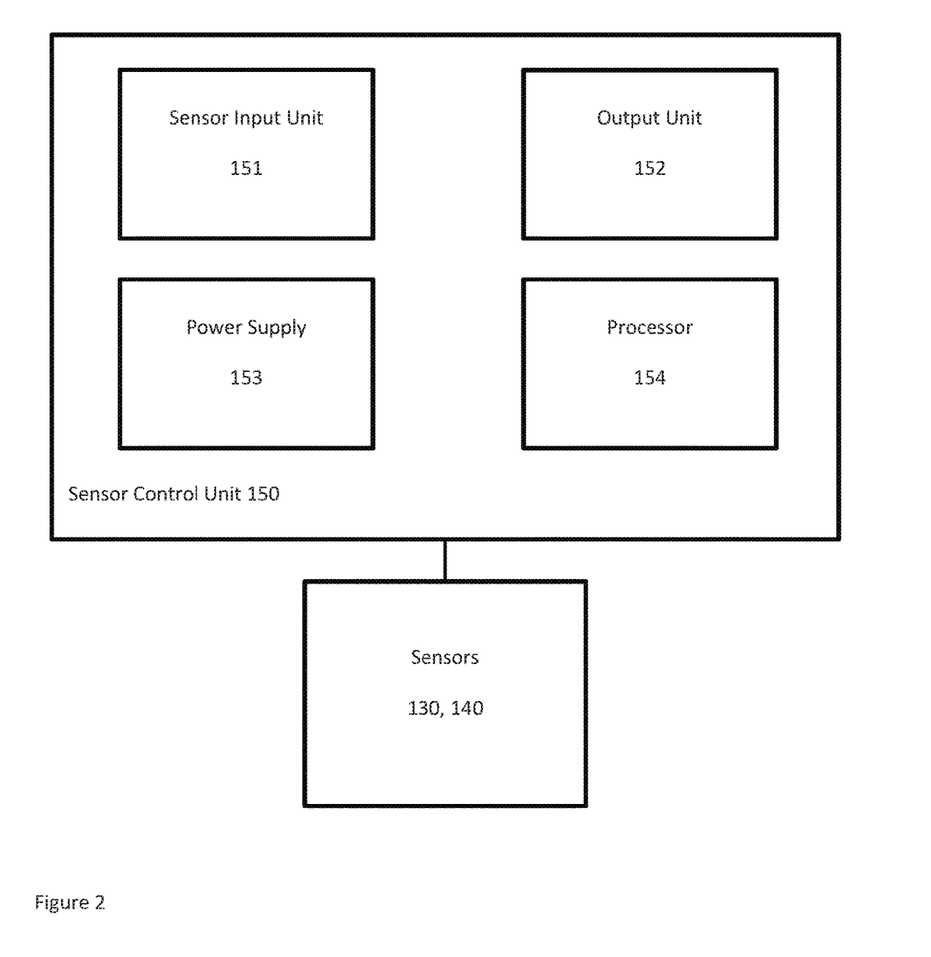
FIG. 2 schematically illustrates a sensing arrangement.

The sensor control unit 150 may also be configured to measure EDA if it is provided with appropriate sensors. However as it is not in contact with the user's skin during normal use of the controller 100 this may be unnecessary. Instead, the sensor control unit 150 may comprise any processing elements and communications circuitry required for operation of the sensors 130 and 140. Such a sensor control unit 150 may be provided anywhere on the controller 100—for example, on the back of the controller 100 so as to ensure no interference with a user's normal operation of the controller 100. Indeed it may be appropriate to locate the sensor control unit 150 according to ease of connection to a controller 100, or to a port 102 on the controller 100 that allows the sensor control unit 150 to draw power (for example, a microUSB port as is located on a side of the Sony® DualShock® 4 controller facing away from the user during normal use, or an extension port as is located on a side of the Sony® DualShock® 4 controller facing towards the user during normal use). Rather than providing a single sensor control unit 150 that corresponds to every sensor that is present, each sensor 130 and 140 may be associated with their own sensor control unit 150. FIG. 2 schematically illustrates a sensing arrangement in which the sensors 130 and 140 communicate with the sensor control unit 150. The sensor control unit 150 is operable to perform any appropriate processing on the collected biofeedback information, and then transmit this information. The sensor control unit 150 may comprise a sensor input unit 151, an output unit 152, a power supply 153 and a processor 154.

It should be noted that the sensors 130 and 140 are not necessarily limited to those that measure EDA; alternative or additional sensors may be provided. For example, additional sensors may be provided that are able to refine measurements of a user's emotional state or help to characterise the emotion that is causing the measured changes in the user's emotional state. For example, the sleeves could further comprise one or more heartrate monitors to provide further biofeedback.

The sensor input unit 151 is operable to receive inputs comprising biofeedback information from the sensors 130 and 140, for example biofeedback information comprising electrodermal activity measurements or heart rate measurements. These measurements may be transmitted immediately, via the output unit 152, or may be first subjected to processing by the processor 154.

The output unit 152 is operable to output information about measurements made by the one or more sensors. The output unit 152 may comprise any suitable wired or wireless transmitter, for example a USB cable or Bluetooth® transmitter respectively. In some embodiments, the output unit 152 is operable to provide sensor information to the controller 100 which may then transmit this information to an associated games console (or the like) using its own wired or wireless connection. Alternatively, or in addition, the output unit 152 may comprise its own wired or wireless transmitter for outputting information to the processing device associated with the controller directly.

Before providing the sensor results to the output unit, they may be processed by the processor 154 in order to provide a more suitable output.

The power supply 153 may provide power to at least one of the sensors 130/140 and/or the processor 154. The power supply 153 may comprise a battery, a connection to a mains adaptor, a connection to the controller 100 (for example via a port 102), or any other appropriate source of power.

The processor 154 is operable to perform processing on the measurements obtained by the sensors, before they are output by the output unit 152. For example, rather than outputting raw sensor data, the data could be processed to generate a binary determination of whether or not the user is experiencing an emotional reaction to a game by comparing sensor values to calibration values. Alternatively, a graduated response could be provided such that a user's reaction is characterised by a response 'rating' corresponding to the severity of the user's reaction to the content displayed. Alternatively, or in addition, the processor 154 could perform processing so as to cause the output unit 152 to only provide an output when there is a change in the level of the user's emotional response.

Alternatively, a processor of the controller may perform appropriate processing of the data (for example D/A conversion), and/or a processor of the receiving videogame console may perform appropriate processing, such as for example the binary determination described above. In such cases, the sensing arrangement itself may not require a processor at all, or only an integrated circuit to perform basic signal processing functions. References herein to the processor 154 thus also encompass reference to a processor of the controller and/or videogame console where applicable.

Figure 1C:
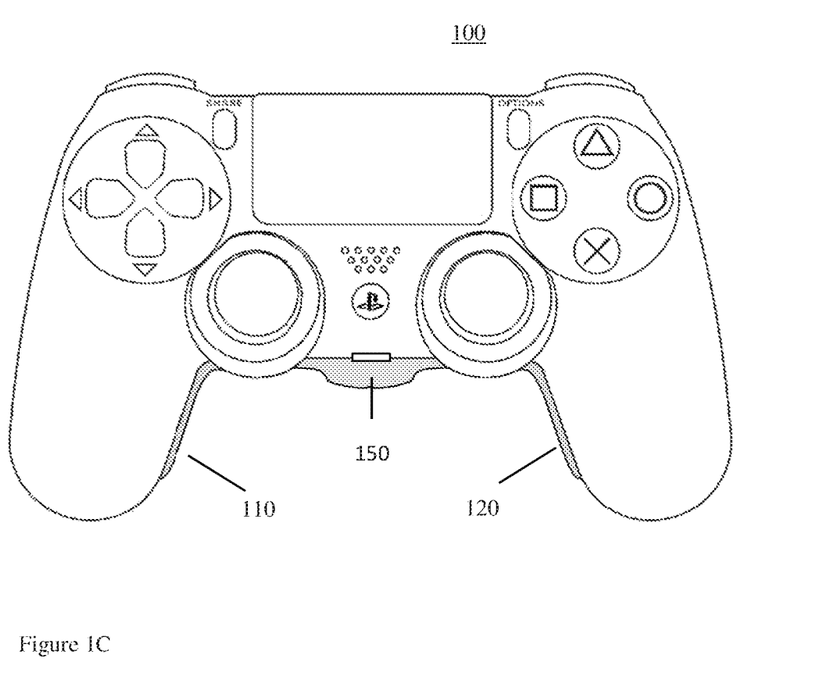
Figure 1D:
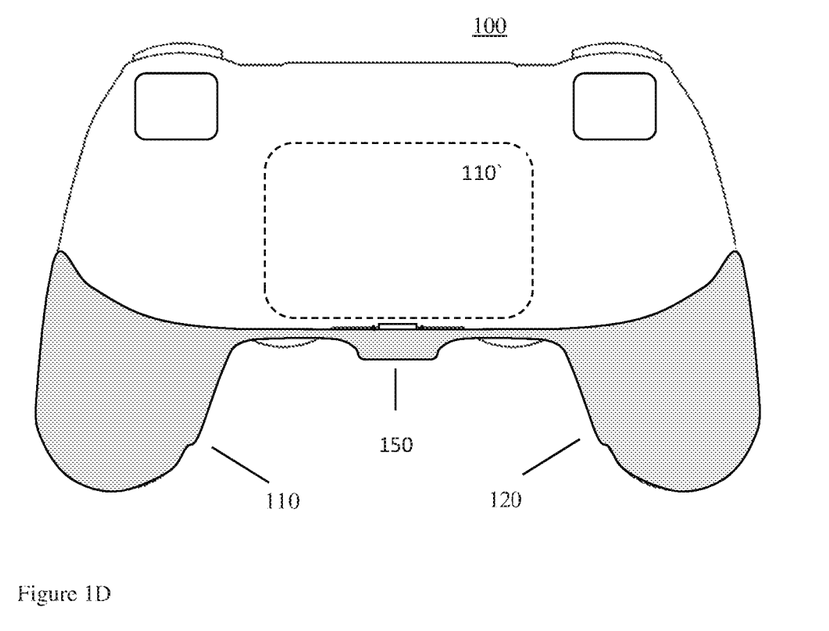

FIGS. 1C and 1D illustrate an embodiment in which the sleeves 110, 120 (or equally sleeves 130, 140) of the sensing apparatus are integral with a sensor control unit 150, which comprises a connector to a PS4 extension port (but again could equally be a micro USB port, or in principle any port of the controller). The sensor control unit may also comprise a through-port to allow other peripherals that would otherwise use the port to be attached. It will be appreciated that at least some of the structural support for the sensing apparatus may be provided by the controller itself when the sensing apparatus is plugged into the port and in position, and hence the sleeves and connecting portion to the sensor control unit can be thin, lightweight and hence unobtrusive. In FIGS. 1C and 1D, the sleeves are shown optionally as half-sleeves that only cover the rear of the controller handles—designs appropriate to a particular controller can be envisaged by the skilled person. Clearly, as discussed above, potentially only one sleeve may be required, and this may not necessarily be positioned on a handle of the controller as long as the user will regularly come into contact with it during normal user (e.g. on a region 110' of the back of the controller where a user rests one or more fingertips).

In order to reduce cost in such an embodiment, then as noted above power may be drawn from the port 102 to supply the sensor(s) and also any processing performed by the sensor control unit. As discussed previously, depending on the capabilities of the controller (for example if audio input to a port is digitised by the controller for wireless communication), then raw input, or a very simple modulation of an appropriate signal by that raw input, may be sufficient to enable the data to be transmitted via the controller back to the videogame console for further processing, without the need for a processor, or only a very simple one, in the sensor control unit itself. For example, a change in resistance or capacitance (or any suitable change in electrical property) of a biofeedback sensor could be used to vary the frequency of an oscillator outputting and audio signal or the DC offset of such an audio signal, which is then supplied to the controller either through a data port or microphone port. The audio signal would then embody the data of biofeedback sensor may be transmitted either as a digital or analogue signal back to the videogame console. An application such as a game compatible with the biofeedback sensor could then interpret the received audio signal as a biofeedback signal, as appropriate.

Figure 3:
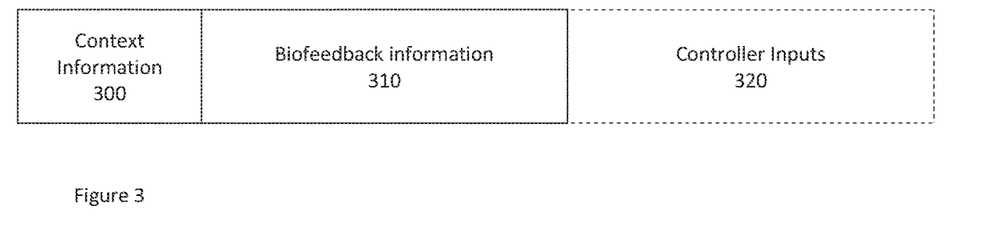
FIG. 3 schematically illustrates a data format for biofeedback information.

FIG. 3 schematically illustrates a data format for communicating biofeedback information to a processing device.

Context information 300 comprises information that identifies the data as relating to biofeedback. While this is shown as a separate header, this information could be included with the biofeedback information 310 or could be inherent, for example, in where the biofeedback information is located within a more general data stream.

The biofeedback information 310 comprises raw or processed data about the user's reactions, such as heart rate data or measurements of EDA. As noted above, this data could be used to provide regular updates of measured values (such as a new measurement every second) or could communicate when changes to the measurements occur.

Depending on the implementation, this information may comprise a single number that indicates a user's emotional arousal; for example, five could be a base value and a range of zero to ten could be used to indicate deviations from this. This may be advantageous for reducing the amount of data that is communicated relative to a transmission of the raw biofeedback information.

Optionally, the data may be packaged with the controller inputs 320. Of course, this is only appropriate if the data from the biofeedback sensors is transmitted to a processing device via the controller. If the data is transmitted directly from the sensor arrangement to the processing device, then the controller inputs typically would not be appended to the sensor information unless the operation of the controller is varied so as to supply the input data to the sensor control unit 150.

In some embodiments, if the sensor data is first output to the controller 100, the controller 100 may be configured so as to provide the data to the console in a format that simulates a button press. For example, an application could inform a user that a lesser-used button (such as the L3 button on a Sony® DualShock® controller) has no function, thus discouraging the user from pressing that button. Instead, the controller could provide sensor data encoded as a series of simulated button presses for that particular button. This is advantageous in that no extra communication functionality need be provided; existing inputs for the controller could still be used. If more than a binary indication of emotional feedback was required, then a value could be conveyed by the frequency of simulated button press.

Alternatively, or in addition, one or more new controller inputs could be defined at a system level that do not have corresponding physical buttons on the controller. These inputs could then only be used by devices such as the biofeedback sensors, thus preventing a user from pressing such a button and causing incorrect data to be transmitted and allowing the full range of controller inputs to still be utilised. In other words, the output information from the sensor apparatus may be interpreted by a controller as a button press and communicated as such to a processing device associated with the controller; in some embodiments, the output information is interpreted as a user pressing a button which has no physical presence on the controller. This may be useful where, for example, a controller uses a button identification scheme that provides scope to identify a button that is not physically present on the controller (for example, an eight bit code to identify one of 25 buttons would leave a number of codes available for non-existent buttons).

It will be appreciated that any existing data channel from the controller may in principle be used if this does not interfere with normal game operation. For example, the controller may provide a dedicated data field for inputs received from the extension port, and transmit these to the videogame console as a matter of course. Similarly, as noted above an audio input from a microphone jack may be a means to convey information to the controller and thereon to the videogame controller. Hence the biofeedback sensor attachment may comprise an output port adapted to interface with an input port of the controller operable to accept audio signals (for example a microphone socket and/or micro-USB port).

The collection of such biofeedback sensor data may be useful in adapting content provided to a user, so as to provide a more personalised experience. This may be particularly advantageous in the context of a virtual reality experience, in which the user may be fully immersed.

In one example, the user may be playing a horror game; while the user would be expecting to experience a certain degree of fear, it is considered that it would be an unpleasant experience for the user if they were too frightened to continue. Thus, it is advantageous to be able to detect when a user is becoming increasingly frightened and to modify in-game parameters (such as number of enemies, type of enemies, environmental lighting levels, or the sounds which are played to the user) so as to reduce the intensity of the gaming experience and put the user more at ease. Similarly, if a user is not experiencing any emotional arousal, such parameters may be modified so as to increase the intensity of the game. This therefore creates a more engaging gaming experience for a user by ensuring that they are appropriately immersed in the game and experiencing the game as intended by the producers. Likewise the game (or the operating system of the videogame console) may monitor the duration of elevated fear/heart rate, and adjust game parameters if this continues for more than a predetermined threshold period, or occurrs for more than a predetermined total amount of time within a given period of time (as a non-limiting example, for more than 20 minutes during a 30 minute period). In this case, the estimated level of prolonged fear that causes a change in game parameter(s) may be lower than an estimated level of heightened or peak fear that similarly triggers a change in game parameter(s).

Alternatively, or in addition, the user's level of emotional arousal may be used to make in-game decisions or to lead their progression through a piece of content that has multiple paths (such as a choose-your-own-ending video). For example, if an enemy appears on-screen then the user may be presented with a choice to either fight or flee the enemy. If the user is experiencing a high level of emotional arousal, then this could be interpreted as an indicator of fear on the user's part and thus the fleeing option is automatically selected. Such an embodiment is therefore an example of biofeedback information replacing controller inputs by a user.

Similarly, such reactions could be used to identify likes and dislikes of the user. For example, if a piece of content has multiple storylines or characters it may be possible to identify which is of greatest interest to the user by measuring their emotional response when particular pieces of content are displayed. In response to this, more screen time could be devoted to particular storylines or characters if they are adjudged to be of greater interest to the user.

In some embodiments, a camera may be associated with the processing device or sensor arrangement. The camera may be operable to capture images of the user that are able to be used to help identify an emotion that the user is experiencing. For example, when the sensors indicate that the user is experiencing emotional arousal processing may be performed on images captured by the user to identify facial expressions, motion or body language cues that may be linked to a particular emotion. In such an arrangement it may therefore be possible to identify specific emotions and to tailor a piece of content to a user more specifically. This may be particularly effective when combined with readings from a heart rate monitor associated with that the sensing apparatus.

Furthermore, in this case it may be possible for the sensor control unit, via connection to a port of the controller, to command the controller to change the colour or some other visible property (such as brightness, or a colour/brightness duty cycle) of a light on the controller to visually signal the user's emotional state to the videogame console (and potentially also provide the user with some visual feedback as to the sensor apparatus' assessment of their emotional state).

It will be appreciated that different people may have different skin conductivity properties, or that the same persons skin conductivity may vary depending on the current state of health, environmental conditions, and other factors. Consequently, a calibration step may optionally be performed to establish a baseline EDA and/or heart rate measurement during a period of use of the controller that is not expected to invoke fear, such as for example during initial interaction with the games' menu. Optionally, where the above techniques are provided to the game via middleware or the operating system, then such calibration may occur before a game that uses the feature has been launched.

Figure 4:
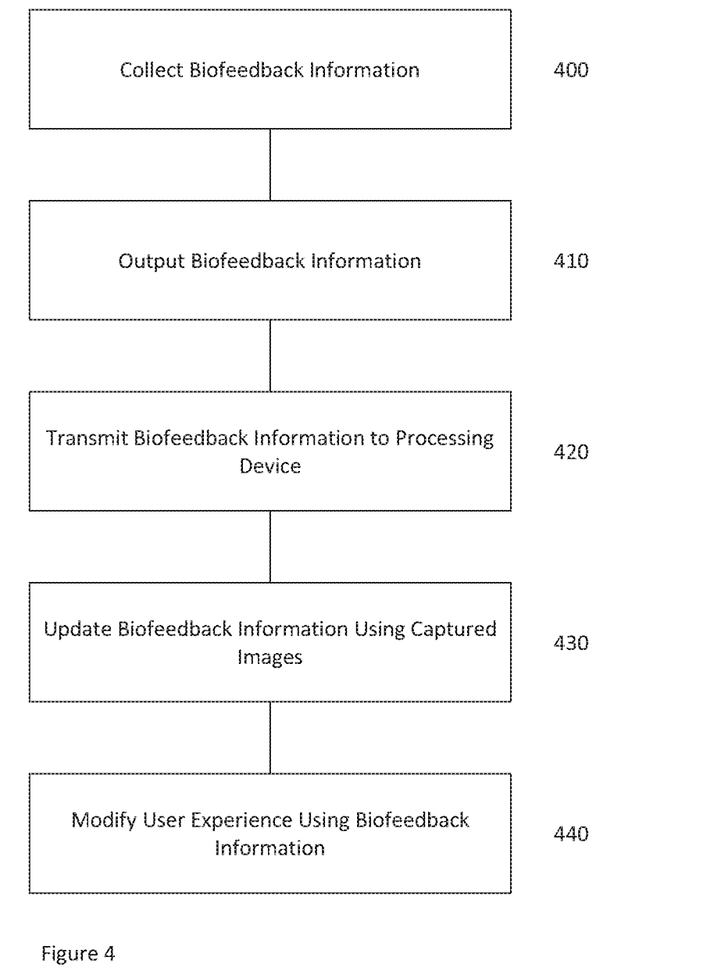
FIG. 4 schematically illustrates a content tailoring method.

FIG. 4 schematically illustrates a method for providing biofeedback using the apparatus described above.

A step 400 comprises collecting biofeedback information using one or more sensors in contact with a user's hand during use of the controller.

A step 410 comprises outputting biofeedback information; as noted above, this may be either in the same format as the data collected in the step 400, or it may be processed so as to be in a more appropriate format.

A step 420 comprises transmitting information to a processing device associated with the controller; this may be part of the step 410 if the sensor arrangement comprises a direct communication with the processing device. If it does not, then the step 420 may comprise a transmission of information from the controller to the processing device.

A step 430 comprises updating the biofeedback information using images captured of the user during the information collection step 410. This comprises using captured images from a camera associated with the sensor arrangement or processor device in order to update the biofeedback information. For example, the images could be used to assess whether a user's emotional arousal is a positive or negative one based upon the user's facial expression.

A step 440 comprises the modifying of a user experience in dependence upon the information collected above. This may result in being shown different video content or a modification of in-game parameters, for example, so as to tailor the provided content to a particular user based upon their emotional reactions.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A biofeedback sensor attachment for a controller, the biofeedback sensor attachment comprising:
   one or more sensors for obtaining biofeedback information arranged such that at least one sensor is in contact with a user's hand during normal use of the controller; and
   an output unit operable to output the biofeedback information about measurements made by the one or more sensors as an audio signal to be input to the controller.

2. The attachment according to claim 1, wherein the biofeedback information comprises one or more selected from the list consisting of:
   i. electrodermal activity measurements, and
   ii. heart rate measurements.

3. The attachment according to claim 1, wherein the sensors are arranged on one or more sleeves that fit at least a portion of the controller.

4. The attachment according to claim 1, wherein the output information is interpreted by a controller as a button press and communicated as such to a processing device associated with the controller.

5. The attachment according to claim 4, wherein the output information is interpreted as a user pressing a button which has no physical presence on the controller.

6. The attachment according to claim 1, wherein the output unit outputs the biofeedback information to a processing device associated with the controller.

7. The attachment according to claim 1, comprising a processor operable to perform processing on the biofeedback information before it is output.

8. The attachment according to claim 1 comprising an output port adapted to interface with an input port of the controller operable to accept audio signals.

9. A method for providing biofeedback information using a biofeedback sensor that is attachable to a controller, the method comprising:
   collecting biofeedback information using one or more sensors in contact with a user's hand during normal use of the controller; and
   outputting information about the biofeedback information collected by the one or more sensors as an audio signal to be input to the controller.

10. The method according to claim 9, wherein the biofeedback information comprises one or more selected from the list consisting of:
   i. electrodermal activity measurements, and
   ii. heart rate measurements.

11. The method according to claim 10, comprising:
   updating the biofeedback information using images captured of the user during the information collection step.

12. The method according to claim 9, comprising:
   modifying content that is displayed to a user in dependence upon the biofeedback information.

13. The method according to claim 9, wherein the biofeedback information is used to select between one or more options presented in a piece of content without the user having to provide a further input.

14. A computer program which, when executed by a computer, causes a computer to perform the method of claim 9.

15. A non-transitory machine-readable storage medium which stores computer software according to claim 14.

* * * * *